US012117181B2

(12) United States Patent
Glanville et al.

(10) Patent No.: US 12,117,181 B2
(45) Date of Patent: Oct. 15, 2024

(54) HIGH EFFICIENCY CONVECTION OVEN

(71) Applicant: GAS TECHNOLOGY INSTITUTE, Des Plaines, IL (US)

(72) Inventors: Paul Eric Glanville, Chicago, IL (US); Shawn Matthew Scott, Mount Prospect, IL (US); Miroslaw K. Liszka, River Grove, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 232 days.

(21) Appl. No.: 17/576,246

(22) Filed: Jan. 14, 2022

(65) Prior Publication Data

US 2022/0136710 A1 May 5, 2022

Related U.S. Application Data

(62) Division of application No. 16/413,217, filed on May 15, 2019, now abandoned.

(60) Provisional application No. 62/671,544, filed on May 15, 2018.

(51) Int. Cl.
*F24C 15/32* (2006.01)
*A21B 1/26* (2006.01)
*F23L 15/04* (2006.01)

(52) U.S. Cl.
CPC ............... *F24C 15/322* (2013.01); *A21B 1/26* (2013.01); *F23L 15/04* (2013.01)

(58) Field of Classification Search
CPC .................................................... F24C 15/322
See application file for complete search history.

(56) References Cited

U.S. PATENT DOCUMENTS

| | | | | |
|---|---|---|---|---|
| 1,550,096 A | * | 8/1925 | Rogers | F24C 3/027 126/39 C |
| 2,035,904 A | * | 3/1936 | Maxon | F23D 14/60 48/188 |
| 3,051,464 A | * | 8/1962 | Yeo | F23D 14/34 431/351 |
| RE25,626 E | * | 7/1964 | Yeo et al. | F23D 14/34 431/351 |
| 3,416,509 A | * | 12/1968 | Huebler | F24C 14/025 165/10 |

(Continued)

FOREIGN PATENT DOCUMENTS

DE 10 2015 111 879 A1 1/2017
JP 2003336832 A * 11/2003

OTHER PUBLICATIONS

European Patent Office, English language version of the Extended European Search Report for EP Application No. 19174713.8, Feb. 25, 2020 (9 pages total).

(Continued)

*Primary Examiner* — Jorge A Pereiro
(74) *Attorney, Agent, or Firm* — Pauley Erickson & Swanson (57) ABSTRACT

Processes and systems for improvements on the efficiencies of convection ovens utilizing exhaust heat recuperation in the form of heat exchangers and premixed combustion systems, and a combination thereof. The heat exchangers and premixed combustion systems allow for increased efficiency of use of fuel and gaseous mixtures within convection oven cavities for improved heating capabilities and decreased efficiency losses.

19 Claims, 5 Drawing Sheets

(56) References Cited

U.S. PATENT DOCUMENTS

| | | | | |
|---|---|---|---|---|
| 3,499,429 A | * | 3/1970 | Perl | F24C 15/2014 110/308 |
| 3,587,557 A | * | 6/1971 | Henderson | F24C 15/2014 126/21 A |
| 3,590,805 A | * | 7/1971 | Perl | F24C 3/027 431/162 |
| 3,608,505 A | * | 9/1971 | Rosenberg | F24C 15/322 126/39 J |
| 3,612,032 A | | 10/1971 | Kweller et al. | |
| 3,741,194 A | * | 6/1973 | Herron | F24C 3/004 126/21 R |
| 3,783,854 A | * | 1/1974 | Hurko | F24C 14/025 126/21 R |
| 4,108,139 A | * | 8/1978 | Gilliom | F24C 15/006 219/400 |
| 4,224,019 A | * | 9/1980 | Dilmore | F23D 14/725 431/328 |
| 4,337,585 A | | 7/1982 | Hebrank | |
| 4,384,850 A | * | 5/1983 | Dixon | F23L 15/04 432/223 |
| 4,424,793 A | * | 1/1984 | Cooperrider | F23D 14/36 126/110 B |
| 4,430,989 A | * | 2/1984 | Narang | F24C 15/322 126/41 R |
| 4,498,453 A | * | 2/1985 | Ueda | F24C 15/322 219/738 |
| 4,550,772 A | * | 11/1985 | Knoch | F24B 7/005 165/47 |
| 4,671,250 A | * | 6/1987 | Hurley | F24C 15/322 126/39 R |
| 4,813,398 A | * | 3/1989 | Savage | F24C 15/322 165/125 |
| 4,846,143 A | * | 7/1989 | Csadenyi | F23D 14/62 431/354 |
| 4,867,132 A | * | 9/1989 | Yencha | F24C 15/322 126/21 R |
| 4,895,513 A | * | 1/1990 | Subherwal | C04B 30/02 427/255.6 |
| 4,919,609 A | * | 4/1990 | Sarkisian | F23D 14/74 431/328 |
| 4,926,837 A | * | 5/1990 | Parker | F24C 3/128 219/400 |
| 4,928,663 A | * | 5/1990 | Nevin | F24C 15/322 416/223 R |
| 4,981,416 A | * | 1/1991 | Nevin | F24C 15/322 415/206 |
| 5,014,679 A | * | 5/1991 | Childs | A47J 27/04 126/369 |
| 5,016,606 A | * | 5/1991 | Himmel | F24C 15/322 126/21 R |
| 5,121,737 A | * | 6/1992 | Yencha, III | F24C 15/322 34/225 |
| 5,222,474 A | * | 6/1993 | Yencha, III | F24C 15/322 431/329 |
| 5,431,557 A | * | 7/1995 | Hamos | F24H 1/40 431/328 |
| 5,460,157 A | * | 10/1995 | Prabhu | F24C 15/322 431/354 |
| 5,471,972 A | * | 12/1995 | Corliss, II | F24C 14/025 126/92 R |
| 5,497,760 A | * | 3/1996 | Alden | F24C 15/322 126/21 R |
| 5,727,539 A | * | 3/1998 | Vroom | F24C 15/322 126/21 R |
| 6,376,817 B1 | * | 4/2002 | McFadden | H05B 6/704 219/400 |
| 7,699,237 B2 | | 4/2010 | Berkenkoetter et al. | |
| 8,146,488 B2 | | 4/2012 | Turrin et al. | |
| 9,851,109 B2 | | 12/2017 | Bilet et al. | |
| 2003/0000513 A1 | * | 1/2003 | Cole | A21B 1/26 126/21 A |
| 2003/0000514 A1 | * | 1/2003 | Cole | A21B 1/26 126/21 A |
| 2003/0000515 A1 | * | 1/2003 | Cole | F24C 15/322 126/21 R |
| 2003/0205222 A1 | * | 11/2003 | Rabas | A21B 3/04 126/21 R |
| 2015/0047812 A1 | * | 2/2015 | Bilet | F24C 3/008 165/104.34 |
| 2016/0219888 A1 | * | 8/2016 | Hegge | A21B 3/04 |
| 2018/0149369 A1 | * | 5/2018 | Carcano | F24C 15/2014 |
| 2018/0149370 A1 | * | 5/2018 | Carcano | F24C 15/322 |
| 2018/0352818 A1 | * | 12/2018 | Hegge | A21B 3/04 |
| 2019/0353354 A1 | | 11/2019 | Glanville et al. | |

OTHER PUBLICATIONS

European Patent Office, Office Action for European Patent Application No. 19 174 713.8, issued May 15, 2019 (9 pages).

* cited by examiner

HIGH EFFICIENCY CONVECTION OVEN

CROSS REFERENCE TO RELATED APPLICATION

This application is a divisional of U.S. application Ser. No. 16/413,217 filed on 15 May 2019, which claims the benefit of U.S. Provisional Patent Application 62/671,544, filed on 15 May 2018. The parent application is hereby incorporated by reference herein in its entirety and is made a part hereof, including but not limited to those portions which specifically appear hereinafter.

BACKGROUND OF THE INVENTION

Field of the Invention

This invention relates generally to ovens and, more particularly, to convection ovens having or exhibiting high operating efficiencies through exhaust heat recuperation.

Description of Related Art

The convection oven as a product and process, in the small (residential/restaurant) and large (industrial baking) context, is covered by a substantial body of known art. This known art includes gas fired convection ovens such as U.S. Pat. No. 5,460,157 which teach what is referred to as a "typical" or "conventional" convection oven in this document. U.S. Pat. No. 7,699,237 for a method for controlling exhaust flow from a cooking cavity of a baking oven concerns the use of variable speed exhaust rates to affect rates of various stages of the baking process. U.S. Pat. No. 8,146,488 is directed to a cooking oven with a premix burner for boilers and relates to the use of a premixed burner, adapted from boilers, to ovens cooking with steam generators. U.S. Pat. No. 4,337,585 is directed to heat recovery and an air preheating apparatus for textile dryer ovens and concerns high-temperature heat recovery from a large industrial oven, using "a plurality of thermal mass disks which operate as heat sponges to pick up heat from exhausts as it leaves the dryer and subsequently to put that heat into entering replacement air."

The basic components and operation of commercial convection ovens are for the most part very similar. For example, commercial convection ovens tend to have induced-draft burners in the bottom of the oven and a fan built into the oven that pulls air from the burner/combustion area through the sides of the oven into the back and into the oven cavity before they are pushed out of the flue of the oven. Commercial convection ovens generally operate in the 40-50% cooking efficiency range. Generally, such cooking equipment include low thermal efficiencies and higher flue gas temperatures due to the higher temperature heat sink (oven cavities are 250-500° F., fryer oil is ~350° F.) and, as a result, thermal efficiency improvements generally require heat recovery from this high temperature exhaust.

Figure 1:
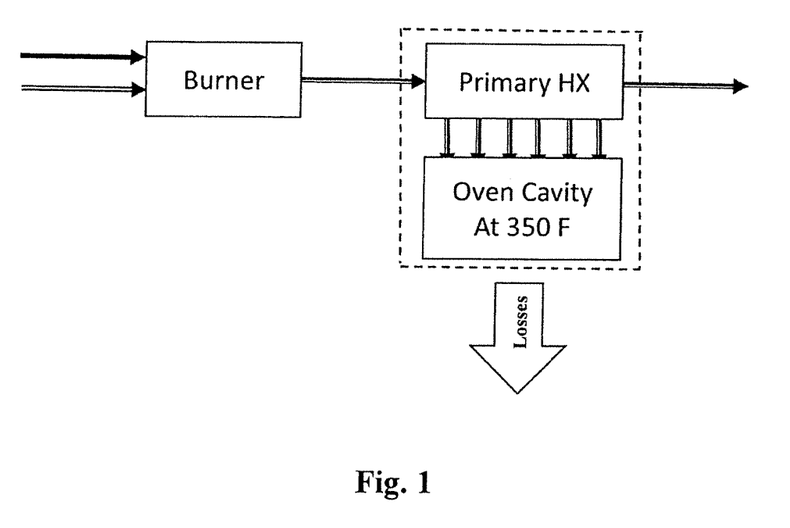
FIG. 1 is a simplified schematic of a conventional convection oven and the operation thereof.

A simple illustration of this for convection ovens follows. The temperature of the oven cavity establishes an effective efficiency limitation on the process, regardless of how effectively or quickly the burner heats the oven contents. For example and as shown in FIG. 1, an oven cavity at 350° F. with an expected 100° F. temperature difference from the hot flue gases to the cavity will necessarily have a thermal efficiency of no greater than 75%, which with typical cycling losses yields an operating efficiency of no more than 67%.

There is a need and a demand for convection ovens, such as for commercial applications, in which convection ovens exhibit or provide increased, desirably significantly increased, operating efficiencies.

SUMMARY OF THE INVENTION

This invention provides a new convection oven assembly or system as well as a new process of convection oven operation having or exhibiting improved or increased, and preferably desirably high, operating efficiencies. Specifically, a preferred convection oven assembly utilizes exhaust heat recuperation, transferring otherwise wasted heat from exiting flue gases to incoming combustion air to a fuel-fired combustion process. Exhaust heat recuperation is currently in use in large scale applications such as industrial furnaces, large stationary engines, process heaters, and other large combustion equipment.

As described in greater detail below, the subject invention development desirably employs and integrates exhaust heat recuperation with convection ovens to achieve operating efficiency gains that have hereto before been unattainable or unrealizable.

As used herein the term 'thermal recuperation' generally refers to the recycling or recovering of energy, e.g., heat, such as might normally be rejected as waste heat, back to the combustion apparatus, e.g., the convection oven.

DETAILED DESCRIPTION

Figure 2:
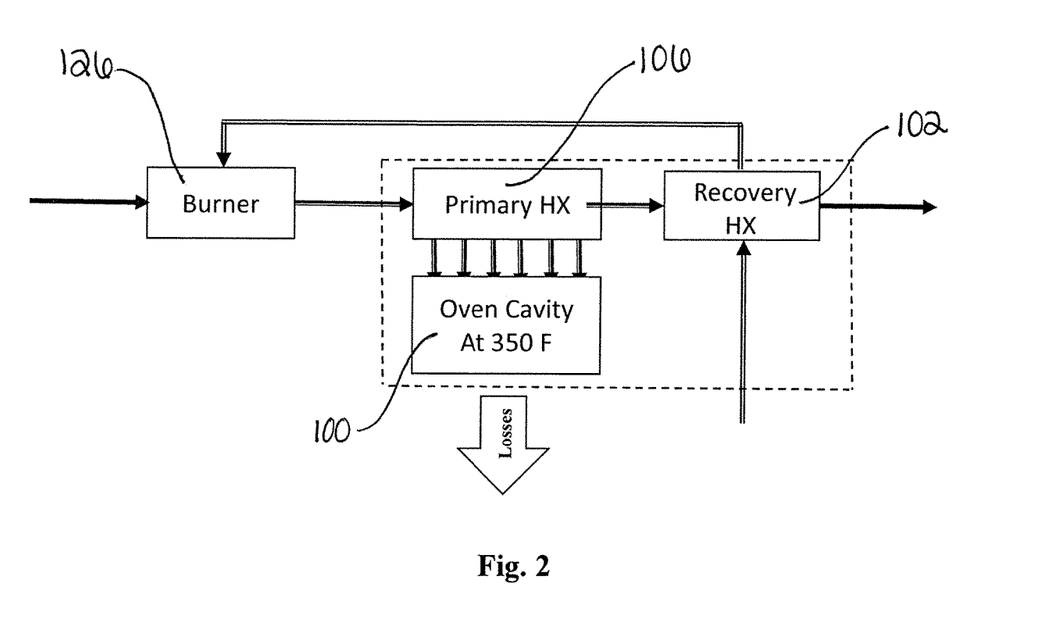
FIG. 2 is a simplified schematic of a convection oven in accordance with one embodiment of the subject invention development and the operation thereof.

The subject invention development acknowledges the operating efficiency limitations of conventional prior art commercial convection ovens such as shown in FIG. 1 and introduces heat recovery external to the oven cavity, such as shown in FIG. 2, to increase thermal/operating efficiencies to 85%/77% respectively, a 10% increase. To achieve this, the subject invention development integrates heat recuperation with a convection oven design (integrating recovery/primary HXs, as shown in FIG. 2) in novel ways for partially-premixed combustion systems, with an inducer blower downstream that "pulls" combustion gas around at least one side of the oven 106 and into the cavity, acting as a primary heat exchanger, and then "pushes" resulting flue gases 112 out of a flue 110 from an oven cavity 100. Also, for more advanced premixed combustion systems that may have "push-only" or "push-pull" designs, the premixed system has the added benefit of better system control through input modulation, better controlling oven temperature and eliminating the large temperature swings around a set point currently experienced with traditional convection ovens. In addition to cooking efficiency, no matter whether food is being cooked or the oven is in standby at a set temperature with no cooking, there is always energy being lost. A great deal of oven energy use is energy lost while no cooking is taking place. The fan on a conventional convection oven is often running, pulling heated air out of the oven even when the burners are not running and no food is being cooked. This results in ovens commonly experiencing very high standby energy losses which account for a large percentage of the overall oven energy use. The incorporation and use of the subject heat recovery system helps to recover heat during standby oven use as well as further decreasing overall energy use of the oven.

In accordance with one aspect of the subject invention development, a novel method of internal heat recuperation is employed to increase the operating efficiency of a commercial convection oven, such as commonly used in restaurants and other food service establishments. In one embodiment, a portion of the exhaust heat, i.e., energy that is normally rejected as waste heat is recycled back to the combustion process via incoming combustion air. In one embodiment, this 'thermal recuperation' is physically performed by a first heat exchanger (HX) 102 that is physically integrated with an oven cavity 100 and in which an exiting flue gas 112 exhaust stream and incoming combustion 114 air communicate via heat transfer. Those skilled in the art and guided by the teachings herein provided will understand and appreciate that many HX designs may apply (counter/co-flow, finned tube/shell-and-tube, etc.). This is expected to be an inexpensive addition to conventional convection ovens, as an example one manifestation of this concept would have tubing on the top, sides and/or bottom of the oven to transfer the heat with little additional cost to the oven design and potentially utilizing existing air-moving equipment (blowers/fans) to drive the process.

Preheating incoming combustion air 114 by cooling exiting flue gases 112 to practical temperature limits is expected to boost the cooking efficiency of the oven by 3-10%.

In accordance with another aspect of the subject invention development, a premixed combustion system is used or employed as opposed to the more common induced-draft combustion systems, to provide even better temperature control along with the efficiency boost in the oven. The use of a premix combustion system 226 within a convection oven permits not only improved control of the cooking process, but also the ability to dramatically reduce the emissions of criteria air pollutants, particularly oxides of nitrogen ($NO_x$) and carbon monoxide (CO). Modulation of the premixed combustion system 226 can reduce cycling energy losses, which are estimated as 8-10%.

In accordance with another aspect of the subject invention development, the recycling of a portion of the exhaust heat back to the combustion process via incoming combustion air, such as discussed above, is desirably combined with the use of a premixed combustion system 314 as opposed to the more common induced-draft combustion systems, to provide even better temperature control along with the efficiency boost in the oven.

The following three embodiments represent various combinations of an improved convection oven.

Figure 3A:
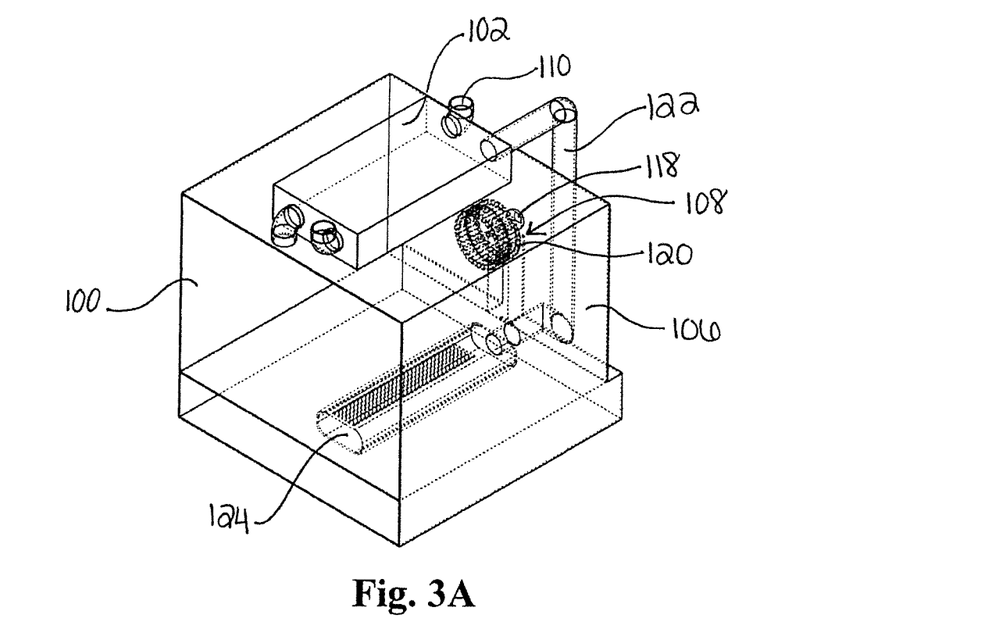
FIG. 3A is a schematic perspective view of a convection oven in accordance with one embodiment of the subject invention.
Figure 3B:
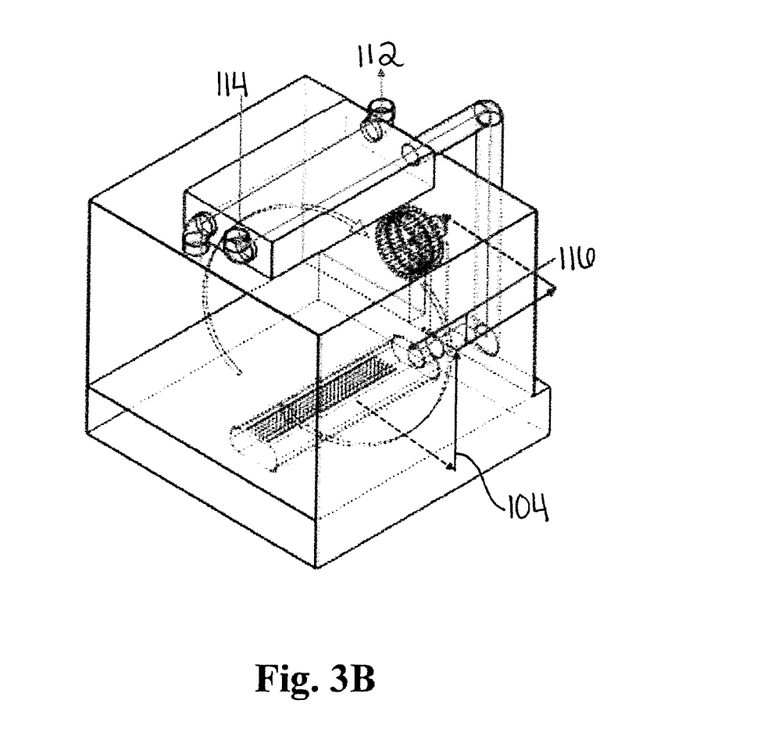
FIG. 3B is a schematic perspective view with a fluid and gaseous flow diagram of a convection oven in accordance with the embodiment of FIG. 3A.

1) Coupling Exhaust Heat Recuperator with a Traditional, Partially-Premixed Combustion System:

As shown in FIGS. 3A and 3B, an Exhaust Heat Recuperator (EHR) such as in the form of one or a series of heat exchangers 102 is integrated with or separate from the overall convection oven that capture otherwise wasted heat from the exiting flue gases 112 to the incoming combustion air 114. In one embodiment of this invention, a recuperative heat exchanger 102 is separate from an oven cavity 100 or cooking cavity of the convection oven, and a combustion air manifold 122 conveys preheated air to the combustion cavity, as shown in FIGS. 2-3B. Based on estimations and limited laboratory testing, an EHR can improve convection oven operating efficiency by up to 10%. The EHR can be comprised of simple flue-to-air heat exchangers to minimize material/manufacturing cost and added pressure drop, such as tube-in-tube, shell-and-tube, finned-tube, utilization of turbulators/inserts or other means of increased surface area, and other methods. While the oven cavity 100 is insulated, it will lose heat and it may be advantageous to have combustion gas 104 pass over an exterior of the oven cavity 100 to capture otherwise wasted skin losses, prior to absorbing heat from the flue gases 112 within the cavity itself and then the first heat exchanger 102.

This concept can be readily integrated into a conventional convection oven design, which uses a blower/inducer 108 at an entrance 118 of the oven cavity 100, which maintains a suitable pressurization within the oven cavity 100 and promotes internal circulation, shown specifically in FIG. 3B, for improved cooking/temperature control. Preferably, a variable speed inducer blower 108: 1) will draw combustion gas 104 into the oven cavity 100 through the at least one side 106 of the oven cavity 100 and, after combustion in a combustion cavity 124, draw hot products of combustion (i.e. flue gases 112) into the oven cavity 100 for circulation; and 2) push out the flue product gases 112 through another side of the oven cavity 100 via the flue 110 to an exhaust vent under slightly positive pressure. Before reaching the combustion cavity 124, the combustion air 114 is mixed with a fuel 116. The combination of the combustion air 114 and the fuel 116 allow the combustion reaction to take place in the combustion cavity 124 to create the resulting combustion gas 104. Integration of the EHR, which necessitates a combustion air intake manifold 122; means of conveying combustion gas 104 from the EHR to the oven cavity 100; and an additional restriction within the EHR for exiting flue gases prior to exit, will likely require the use of a more powerful blower inducer as a secondary inducer 120 as a part of the oven cavity 100.

Figure 4A:
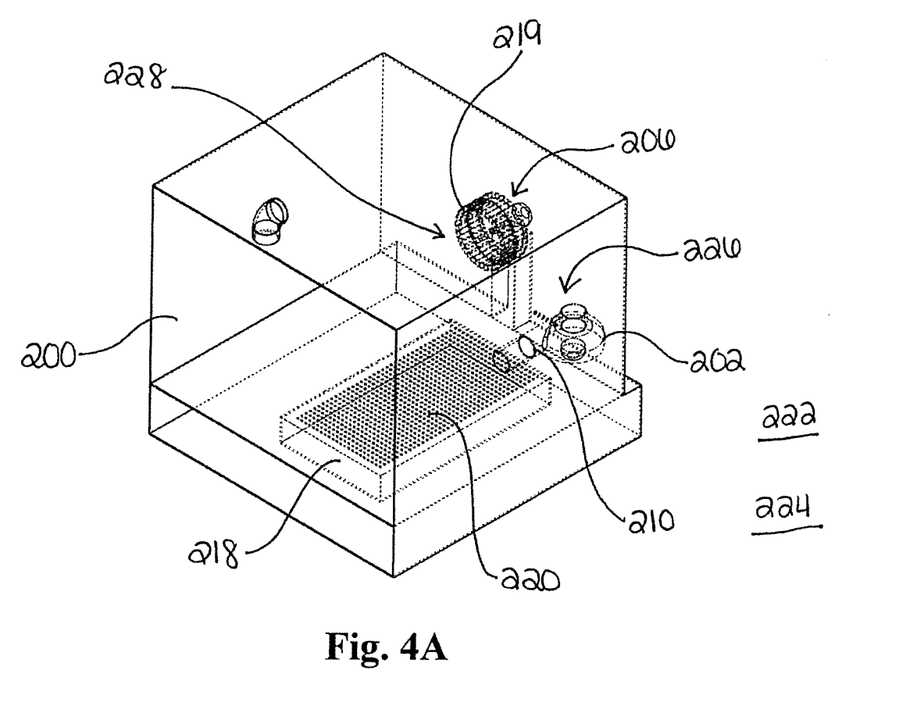
FIG. 4A is a schematic perspective view of a convection oven in accordance with another embodiment of the subject invention development and the operation thereof.
Figure 4B:
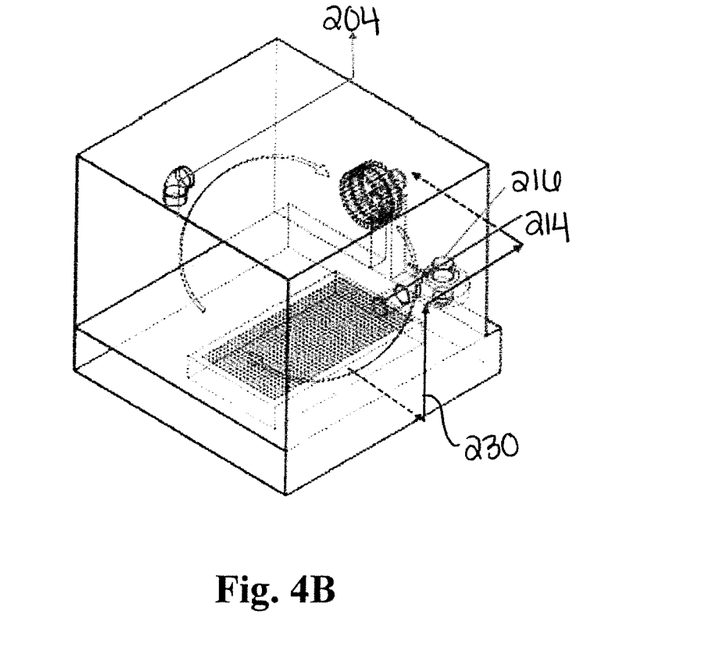
FIG. 4B is a schematic perspective view with a fluid and gaseous flow diagram of a convection oven in accordance with the embodiment of FIG. 4A.

2) Convection Ovens with Premixed Combustion System:

Shifting from a partially-premixed, induced draft combustion system to a premixed combustion system 226 in FIGS. 4A and 4B, within an oven cavity 200 the convection oven in isolation has clear advantages. In summary, an electronically-controlled blower 202 "pushes" a fuel/air mixture into a high-efficiency premix burner 220 which provides a controlled hot stream of flue gases 204 to be drawn into the oven cavity 200. The premixed combustion system 226 premixes a fuel supply 214 and an air supply 216 prior to introduction to the oven cavity 200. The premixed combustion system 226 draws the fuel supply 214 and the air supply 216 into the oven cavity 200 by utilizing the blower 202, the premix burner 220 and a fuel and air mixer 210, which may exist immediately upstream or downstream (as shown) of the blower 202.

The subject embodiment has a number of key and unique advantages. The premix burner 220 can be designed in such a manner to take advantage of the precise fuel/air mixture flow control by working in conjunction with the fuel and air mixer 210 so as to reduce NOx and CO emissions. The premix burner 220 as part of a combustion cavity 218 is placed relative to the oven cavity 200 to receive the fuel supply 214 and the air supply 216 once they have been combined via the fuel and air mixer 210. The burner 220 may be composed of perforated, high-temperature resistant metal, sintered, woven, or knitted metal fiber mats, porous ceramic or metallic foamed solids, or other material. Through this, the convection oven using the premixed combustion system 226 can achieve low NOx and CO emission rates not feasible with conventional induced-draft, partially-premixed combustion systems.

The premixed combustion system 226, including the electronically-controlled blower 202 with variable speeds, fuel and air mixer 210 with proportional control (pneumatic or electronic fuel metering), and the premix burner 220, will be capable of modulation. This modulation, increasing or decreasing the heating rate with time, will enable the oven to more tightly maintain oven cavity 200 temperatures and vary the heat input to the oven with time as required by the cooking or baking process as per electronic control. Modulation, when controlled effectively, also will reduce cycling losses and increase operating efficiency. Additionally, by virtue of a compact flame structure with the premix burner 220, this can better enable safer combustion and oven operation with improved ignition and flame sensing controls for the combustion cavity 218.

Additionally, through improved fuel supply 214 and air supply 216 mixing control, the convection oven can operate with less excess combustion air. Typically convection ovens operate with large amounts of dilution, 10-16% stack $O_2$ on a dry basis, by virtue of the partially-premixed combustion system and to minimize CO emissions. With the premix burner 220, this dilution can be dramatically reduced, which improves combustion efficiency, reduces the volume of the air supply 216 required and thus the blowers 202/219 energy to move it, and can more effectively cook a product through a better balance of heating and drying. On the latter, flue gases 204 with a lower excess air supply 216 level will have a higher concentration of water vapor (a higher dew point) and dry product at a slower rate relative to the heating rate, assuming the design flows flue gases 204 through the oven cavity 200. Coupling the precise control of the premix combustion process with independent control of the oven cavity 200 circulation, permits reducing excess aeration for sake of efficiency while permitting the oven to circulate combustion gas 230 both within and outside the cavity 200 to promote effective cooking.

It is generally advisable that the oven cavity 200 not be excessively pressurized. This is for at least two reasons, oven doors commonly do not seal perfectly and in normal operation kitchen staff will open/close the doors while the oven is operating. A pressurized oven cavity would promote leakage from the front and, upon opening the door, push hot gases onto oven operators. As a result, it is required that care be taken with the degree of pressurization of the combustion cavity 218 and that the blower/inducer 219 downstream of the combustion cavity 218 will be required.

Sizing the blower/inducer 219 for a 'balanced' design, such that the combustion cavity 218 is slightly pressurized to overcome the flue gas 204 pathway to the oven cavity 200 (and any upstream combustion air ducting) but the blower/inducer 219 at or downstream of the oven cavity 200 ensures the oven at an acceptable level of pressurization. This can be further ensured by a differential pressure sensor 206 between the oven cavity 200 and an installation space 228.

Improved sealing of a door 224 of the oven and an operational lock 222 on the door 224 to prevent opening until the combustion system is off or at a sufficiently low heating rate setting will also assist in maintaining a desired pressurization.

With a focused intake of the air supply 216, into the combustion premix burner 220, care will be required to avoid drawing in grease/dust laden air into the burner 220. As a result, it may be advantageous to use inlet filtering of the air supply 216 and/or draw the air supply 216 from a specific location (rear of oven, etc.) to limit issues arising.

Figure 5A:
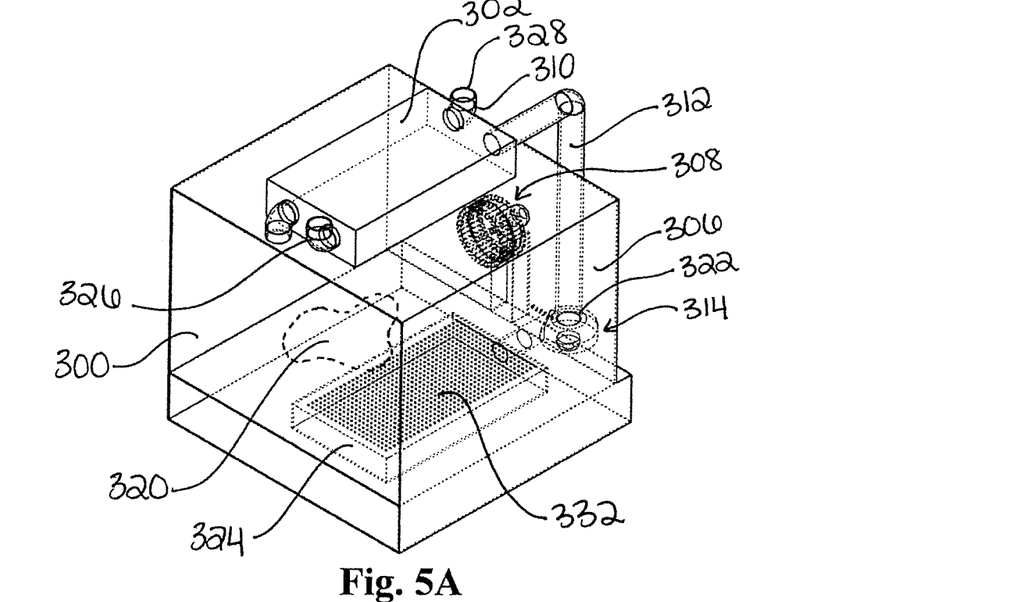
FIG. 5A is a schematic perspective view of a convection oven in accordance with yet another embodiment of the subject invention development and operation thereof.
Figure 5B:
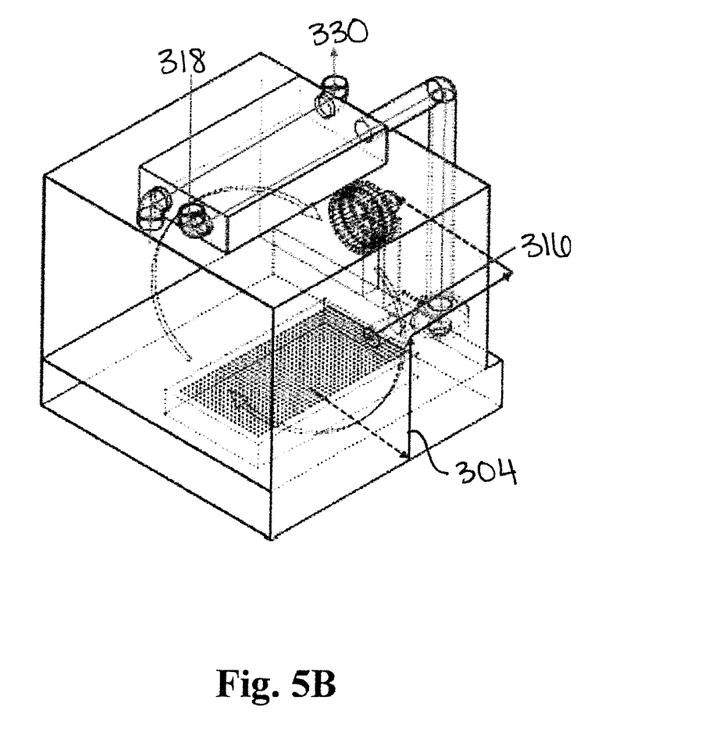
FIG. 5B is a schematic perspective view with a fluid and gaseous flow diagram of a convection oven in accordance with the embodiment of FIG. 5A.

3) Coupling Exhaust Heat Recuperator with Premixed Combustion System:

This additional embodiment shown in FIGS. 5A and 5B is in effect combining items 1) and 2), which in addition to all the advantages described above, permit additional advantages.

The subject embodiment, as shown in FIGS. 5A and 5B, has potential for improving operating efficiency as the solutions are additive in nature, an exhaust heat recuperator (EHR) 302 increasing steady state efficiency by 3-10% while a premixed, modulating combustion system 314 reduces the system cycling losses, further increasing operating efficiency in an oven cavity 300 by up to an additional 8%. The oven cavity 300 is therefore a hybrid of the oven cavities in 1) and 2).

The premixed combustion system 314 will effectively meter combustion gases 304, and combustion air 318 that is necessary for complete combustion, controlling the volume of air 318 and flue gases 330 flowing through the EHR 302 and the premixed combustion system 314. To aid in this control, a bypass 326 may be located on the EHR 302 as an alternate to a flue exit 328 also on the EHR 302. This limits the EHR 302 physical size and/or air-moving equipment necessary to overcome the pressure drop of the EHR 302. The premix combustion system 314 will first mix fuel 316 and air 318 before the EHR 302 transports combustion gases 304 throughout the oven cavity 300.

With the EHR 302, the convection oven will necessarily collect and transport combustion gases 304 upstream of the oven cavity 300, and with the premixed combustion system 314 a downstream blower/inducer 308 can overcome the pressure drop associated with this. The downstream blower/inducer 308 can pull the combustion gases 304 through a side 306 of the oven cavity 300; and then subsequently push the combustions gases 304 out of a flue 310 through the oven cavity 300. This means coupling the EHR 302 and combustion air manifold 312 with the premixed combustion system 314 will, in most cases, require a combustion blower 322 at or upstream of where the fuel 316 and air 318 is mixed together prior to this mixture reaching a premix burner 332 and then a combustion cavity 324. Where air moving equipment is located, the downstream blower/inducer 308 will be necessary at or upstream of the oven cavity 300. This arrangement can act to decouple the circulation within the oven from the movement of flue gases 330, which may be advantageous for improving cooking times by stabilizing cavity temperatures and reducing the boundary layer thickness on a product 320 inside the oven cavity 300.

In the small (residential/restaurant) and large (industrial baking) context, the subject invention desirably incorporates or utilizes: (a) premixed combustion with precise heating control; (b) exhaust heat recuperation to combustion air for partially-premixed and premixed combustion applications;

and (c) the system controls required as a method of use in ways that have hereto before not been described by the prior art. More particularly, for example, 1) the subject invention development provides high-efficiency and goes beyond baking-only applications; 2) the designs and operation of the subject invention development are not applied to ovens with steam generators; and 3) the subject invention development neither uses thermal storage or other batch process for heat recuperation.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A convection oven, comprising:
    an oven cavity including a cavity wall;
    a premix burner in combination with the oven cavity, and configured to provide combustion products to the oven cavity;
    a first blower or inducer fan attached to the cavity wall, and configured to circulate the combustion products within the oven cavity;
    a second blower in combination with the premix burner, and configured to introduce a pressurized mixture of fuel and air into the premix burner and
    a system control configured to:
        control a pressure or temperature increase in the oven cavity by controlling a volume of combustion gases flowing through the recuperative heat exchanger;
        control a combustion heating rate and combustion gas recirculation by stabilizing temperatures in the oven cavity; and
        improve cooking by reducing a boundary layer thickness on a product inside the oven cavity through independent control of the first blower or inducer fan and second blower.

2. The convection oven of claim 1, further comprising:
    a flue gas exhaust path; and
    a recuperative heat exchanger in combination with the flue gas exhaust path.

3. The convection oven of claim 2, further comprising:
    a combustion air path connected with the premix burner, wherein the flue gas exhaust path transfers heat to the combustion air path in the recuperative heat exchanger.

4. The convection oven of claim 2, wherein the recuperative heat exchanger is external to the oven cavity.

5. The convection oven of claim 2, wherein the recuperative heat exchanger is configured to deliver preheated combustion air to the second blower and/or premix burner.

6. The convection oven of claim 1, wherein the premix burner comprises a flame holder composed of a porous, high-temperature resistant material, wherein the pressurized mixture of fuel and air is blown from the second blower to the flame holder.

7. The convection oven of claim 1, wherein the second blower is further adapted to maintain internal circulation in the oven cavity for improved temperature control.

8. The convection oven of claim 1, wherein a portion of the combustion products from the premix burner are introduced to the oven cavity through the first blower or inducer fan.

9. The convection oven of claim 8, wherein the first blower or inducer fan is configured to overcome pressure drops in the oven cavity.

10. The convection oven of claim 1, wherein the first blower or inducer fan is configured to pull combustion products through an opening in a side of the oven cavity and reintroduce the combustion products to the oven cavity.

11. The convection oven of claim 1, wherein the second blower comprises a variable speed blower, configured to permit variable heating rates independent of a combustion gas recirculating within the oven cavity.

12. A method of operating the convection oven of claim 1, the method comprising steps of:
    premixing a fuel supply and an air supply to obtain the fuel/air mixture;
    introducing the fuel/air mixture into the premix burner with the second blower resulting in combustion products; and
    introducing the combustion products into the oven cavity.

13. The convection oven of claim 1, wherein the second blower is configured to pressurize all the fuel and air for combustion within the premix burner.

14. A convection oven, comprising:
    an oven cavity including a cavity wall and a flue gas exhaust path;
    a premix burner in combination with the oven cavity, and configured to provide combustion products to the oven cavity, wherein the premix burner comprises a flame holder composed of a porous, high-temperature resistant material;
    a first blower or inducer fan attached to the cavity wall, and configured to circulate the combustion products within the oven cavity;
    a second blower in combination with the premix burner, and configured to introduce a fuel/air mixture into the premix burner;
    a recuperative heat exchanger in combination with the flue gas exhaust path; and
    a system control configured to:
        control a pressure or temperature increase in the oven cavity by controlling a volume of combustion gases flowing through the recuperative heat exchanger;
        control a combustion heating rate and combustion gas recirculation by stabilizing temperatures in the oven cavity; and
        improve cooking by reducing a boundary layer thickness on a product inside the oven cavity through independent control of the first blower or inducer fan and second blower.

15. The convection oven of claim 14, further comprising:
    a combustion air path connected with the premix burner, wherein the flue gas exhaust path transfers heat to the combustion air path in the recuperative heat exchanger.

16. The convection oven of claim 14, wherein the recuperative heat exchanger is configured to recover useful heat from gases exiting the oven cavity to preheat air entering a combustion cavity, wherein the air is drawn in by the second blower.

17. The convection oven of claim 14, wherein the recuperative heat exchanger is external to the oven cavity.

18. The convection oven of claim 14, wherein the second blower is further adapted to maintain internal circulation in the oven cavity for improved temperature control.

19. The convection oven of claim 14, wherein the first blower or inducer fan is configured to pull combustion products through an opening in a side of the oven cavity and reintroduce the combustion products to the oven cavity.

\* \* \* \* \*